United States Patent [19]

Morohashi

[11] 4,267,489
[45] May 12, 1981

[54] THIN SCHAUKASTEN
[75] Inventor: Hisao Morohashi, Yokohama, Japan
[73] Assignee: Ohno Research and Development Laboratories Company Limited, Yokohama, Japan
[21] Appl. No.: 95,303
[22] Filed: Nov. 19, 1979
[30] Foreign Application Priority Data Dec. 1, 1978 [JP] Japan .......................... 53/165653[U]
Apr. 3, 1979 [JP] Japan ................................. 54/40171

[51] Int. Cl.$^3$ ............................................ G02B 27/02
[52] U.S. Cl. ...................................... 315/324; 40/361; 40/367; 315/210
[58] Field of Search ............... 315/186, 189, 210, 219, 315/312, 324, DIG. 7; 40/361, 367; 362/311

[56] References Cited
U.S. PATENT DOCUMENTS 1,868,521  7/1932  Bucky ................................ 40/361
3,796,916  3/1974  DeBelder et al. .................... 315/151
4,118,654  10/1978 Ohta et al. ............................. 40/361

Primary Examiner—Eugene R. LaRoche

[57] ABSTRACT

A thin schaukasten which is composed of a diffusive transparent plate, a light homogenizing member, a fluorescent lamp and a reflection member and in which the light homogenizing member has a reflection pattern formed on a transparent support media to provide a distribution of transmission for preventing non-uniform luminous intensity on one surface of the diffusive transparent plate and the reflection member is disposed in such a manner as to reduce non-uniformity in luminous intensity on one surface of the light homogenizing member. A lighting circuit for the fluorescent lamp includes a frequency converter for preventing flicker when the fluorescent lamp is lit, and the lighting circuit is used in common to a plurality of fluorescent lamps.

8 Claims, 13 Drawing Figures

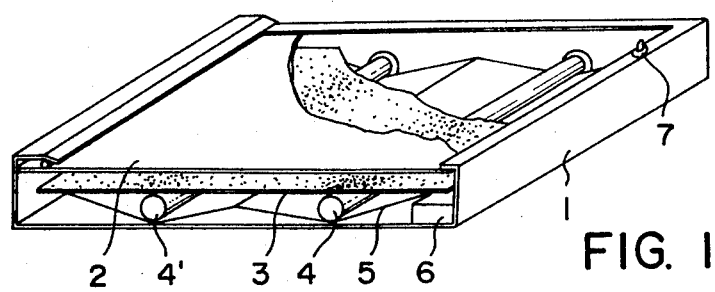
FIG. 1
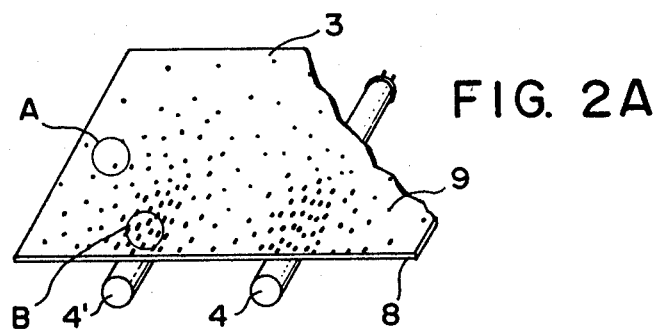
FIG. 2A
FIG. 2B
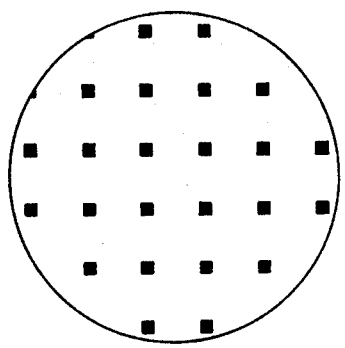
FIG. 2C
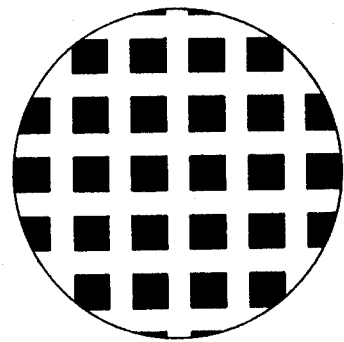

THIN SCHAUKASTEN

BACKGROUND OF THE INVENTION

1. Field of the Invention

This invention relates to a schaukasten for observing an image forming film through utilization of light passing through a light diffusing plane, and more particularly to a thin schaukasten which is formed by a diffusive transparent plate, a light homogenizing member, a fluorescent lamp or lamps and a reflection member.

2. Description of the Prior Art

Generally, in a schaukasten for observing an image forming film using light passing through a light diffusing plane, the distribution of luminous flux in the light diffusing plane is required to be uniform. A method that has heretofore been employed to meet this requirement is to increase the distance between a fluorescent lamp and the light diffusing plane; however, this inevitably increases the thickness of the schaukasten. Accordingly, the conventional schaukasten is bulky and requires a large dead space for its installation, and such schaukasten is heavy and hence is difficult to carry. Further, a large distance between the fluorescent lamp and the light diffusing plane leads to the defect of increased loss of light.

To overcome such defects, there has also been proposed to reduce the thickness of the schaukasten by increasing the number of fluorescent lamps used, using a diffusive transparent plane of a high diffusion coefficient or using a special light source such as a neon lamp or electroluminescence device. However, the schaukasten reduced in thickness by such method has the defects of high manufacturing cost, high running cost, heavy weight, complexity in the operation for exchanging the light source and unnecessarily high brightness which imposes marked eye-strain on the user.

In a schaukasten having incorporated therein fluorescent lamps, since the lighting frequency for the fluorescent lamp is the same as the frequency of the commercial power source, flicker is visible in the vicinity of the fluorescent lamp. Especially when the fluorescent lamp used is small-sized or near the end of its useful life, the flicker is remarkable to give the user an unpleasant feeling and to impose heavy eye-strain on him.

Further, the schaukasten having incorporated therein fluorescent lamps calls for one lighting circuit for each lamp, and hence is expensive and heavy. The cost of the schaukasten of this type is markedly increased by the provision of a frequency converter.

There has not been proposed a thin schaukasten which is composed of a diffusive transparent plate, a light homogenizing member, a fluorescent lamp or lamps and a reflection member and in which the lighting circuit for the fluorescent lamps includes a frequency converter and is used in common to the fluorescent lamps.

SUMMARY OF THE INVENTION

An object of this invention is to provide a thin schaukasten in which light on a light diffusing plane is made uniform using a light homogenizing member.

Another object of this invention is to provide a thin schaukasten which requires less dead space for its installation and hence need not be embedded in a wall and which is easy to carry and reduces loss of light.

Another object of this invention is to provide a thin schaukasten which employs a small number of commercially available fluorescent lamps and a diffusive transparent plate of small loss of light, which is low in manufacturing cost and in running cost, lightweight and which allows ease in exchanging the fluorescent lamps and provide proper brightness on the screen.

Another object of this invention is to provide a thin schaukasten which is free from flicker of light of a fluorescent lamp or lamps and hence does not impose an unnecessary strain on the user's eyes.

Another object of this invention is to provide a thin, inexpensive, small-sized schaukasten which uses a lighting circuit in common to a plurality of fluorescent lamps.

Another object of this invention is to provide a thin schaukasten which ensures to prevent non-uniform luminous intensity on a light diffusing plane in all directions.

Yet another object of this invention is to provide a thin schaukasten which is free from noise generation by a fluorescent lamp lighting device.

BRIEF DESCRIPTION OF THE DRAWINGS

FIG. 1 illustrates in perspective an embodiment of the thin schaukasten of this invention;

FIG. 2A shows in perspective one part of the schaukasten of FIG. 1;

FIGS. 2B and 2C are enlarged views of two parts of A and B of FIG. 2A respectively;

DESCRIPTION OF THE PREFERRED EMBODIMENTS

Figure 3:
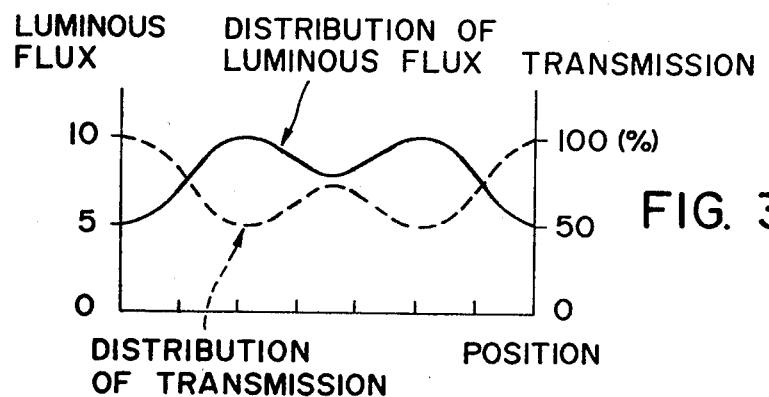
FIG. 3 is a graph explanatory of the relationship between the distribution of luminous flux and the distribution of transmission.

FIG. 1 illustrates, by way of example, a small-thickness type schaukasten of this invention for observing an image forming film through utilization of rays of light which pass through a light diffusing surface. In FIG. 1, the schaukasten comprises a flat casing 1 and a diffusive transparent plate 2, a light homogenized member 3, fluorescent lamps 4 and 4' and a reflection member 5 mounted in the casing 1 and includes a lighting device 6 and a switch 7. The diffusive transparent plate 2 is a commercially available opalescent acrylic plate having a thickness of 2 mm. The light homogenizing member 3 is a 2 mm thick transparent acrylic plate 8 on which a reflection pattern 9 of a white ink is provided, by screen printing, in the form of dots spaced 1 mm apart, as shown in FIG. 2A. The reflection pattern 9 is formed on the transparent acrylic plate 8 so that the dots are large in size on those areas where the amount of luminous flux from the fluorescent lamps 4 and 4' is large, but small in size on those areas where the amount of luminous flux is small, as will be seen from FIGS. 2A, 2B and 2C. The distribution of the luminou flux and the distribution of the transmission of the light homogenized member 3 by the reflection pattern 9 bear substantially an opposite relationship to each other, as shown in FIG. 3. The distributions shown in FIG. 3 are those in the direction perpendicular to the axes of the fluorescent lamps 4 and 4' at their center.

A description will be given of a method for making the distribution of the transmission of the light homogenizing member 3 by the reflection pattern 9 bear an opposite relationship to the distribution of luminous flux. After the distribution of luminous flux on the same plane as the light homogenized member 3 is recorded as density distribution on a silver salt film, the density distribution thus recorded in analog form is resolved by a contact screen into dots on a lithographics film, forming thereon in the digital form dot images having an area ratio. The lithographics film is used as a master film to obtain a plate for the abovesaid screen printing for the formation of the reflection pattern 9. The fluorescent lamps 4 and 4' are 40 W straight bulb type daylight fluorescent lamps placed on the market and they are disposed in parallel between the light homogenized member 3 and the reflection member 5. The reflection member 5 is an aluminum plate one side of which is polished to form a mirror surface, and this reflection member 5 is disposed with the mirror surface lying on the side of the fluorescent lamps 4 and 4'.

Figure 4:
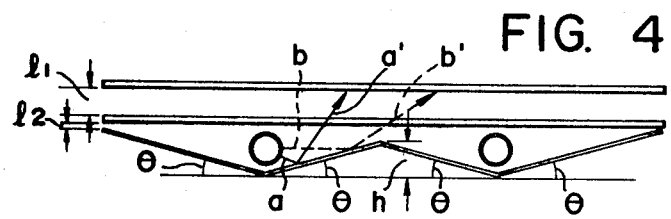
FIG. 4 shows in section one part of the schaukasten of FIG. 1.

In FIG. 4 illustrating one part of the arrangement of FIG. 1, the distance $l_1$ between the diffusive transparent plate 2 and the light homogenized member 3 is 18 mm, and the distance $l_2$ between the light homogenized member 3 and the outer wall of each of the fluorescent lamps 4 and 4' is 2 mm. The reflection member 5 has, in the direction perpendicular to the axis of each of the fluorescent lamps 4 and 4', a triangular configuration that the angle $\theta$ between the reflection member 5 and one surface of the light homogenized member 3 is 18° and that the height h between the fluorescent lamps 4 and 4' is 20 mm. The distance between the diffusive transparent plate 2 and the reflection member 5 in the normal path from the outer wall of each of the fluorescent lamps 4 and 4' is larger than the distance between the reflection member 5 and each fluorescent lamp.

Figure 5:
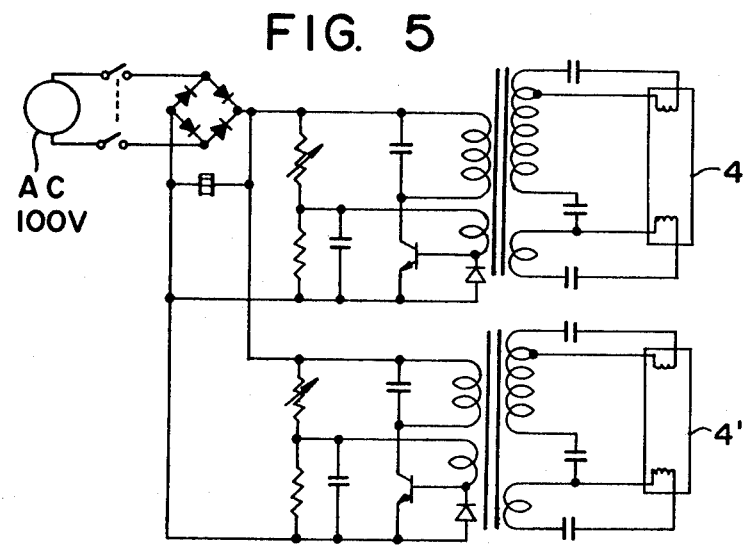
FIGS. 5, 6 and 7 are circuit diagrams of lighting devices for lighting two fluorescent lamps.
Figure 6:
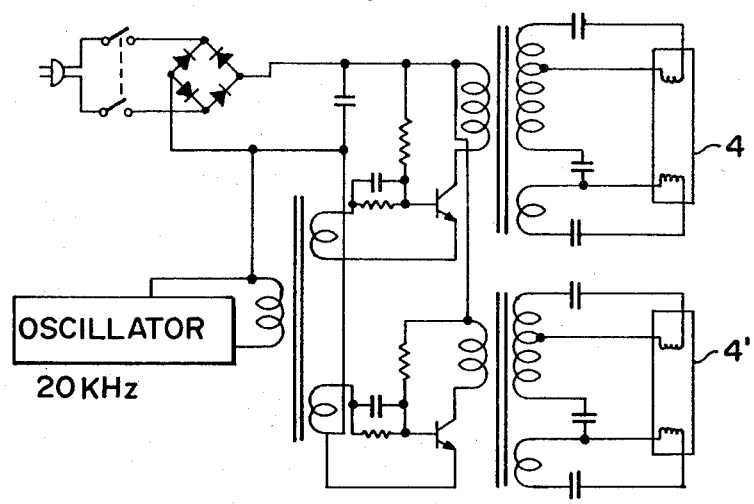
Figure 7:
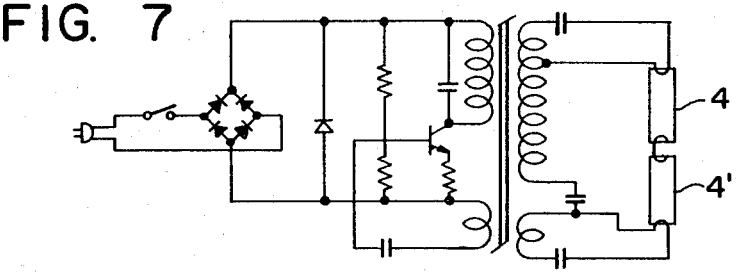
Figure 8:
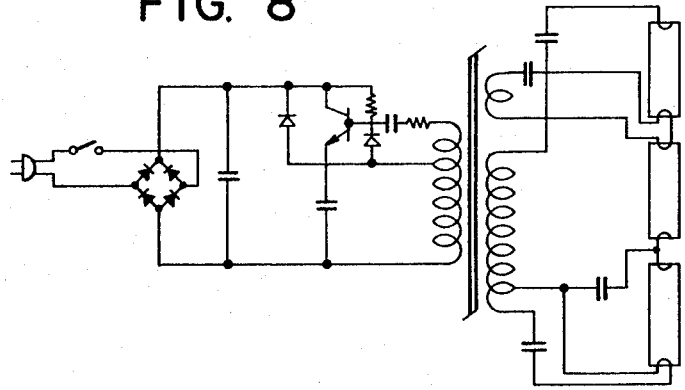
FIG. 8 is a circuit diagram of a lighting circuit for lighting three fluorescent lamps.

A lighting circuit of the lighting device 6 for the fluorescent lamps 4 and 4' is such as shown in FIG. 5 in which an AC commercial power source is rectified into a direct current and oscillated by transistors and coils at 20 KHz and then boosted to light the fluorescent lamps 4 and 4'. In FIG. 5, a diode bridge and an electrolytic capacitor for rectification and smoothing are both used in common to the fluorescent lamps; the transistors used are 2SC940 (Nippon Electric Co., Ltd.) and the cores used with the coils are EI30H5A (TDK Electronics Co., Ltd.). FIG. 6 shows a lighting circuit which is improved from the circuit of FIG. 5 for stabilizing the oscillation frequency and in which parts for rectification, smoothing and oscillation are used in common. FIG. 7 illustrates a modified form of the circuit of FIG. 6, in which the circuit arrangement of FIG. 6 is simplified so that the fluorescent lamps 4 and 4' are lit by a common lighting circuit. FIG. 8 illustrates a simple-structured lighting circuit which is employed in the case of using three fluorescent lamps for the purpose of further brightening the thin schaukasten of this embodiment and in which one lighting circuit is used in common to the three fluorescent lamps as is the case with FIG. 7.

When the diffusive transparent plate of the thin schaukasten of this embodiment, with its fluorescent lamps lit, was observed with the naked eye, no unevenness was found in the distribution of luminous flux, and when the surface of the diffusive transparent plate was scanned by a photo sensor, the difference between maximum and minimum values of the distribution of luminous flux was in the range of about 10%. Further, flicker dependent on the lighting frequency was not observed, and unevenness in the distribution of luminous flux was hardly visible on the diffusive transparent plate in any directions.

The constructions, configurations and sizes of the diffusive transparent plate, the light homogenized member, the fluorescent lamps and the reflection member and their relative arrangement are determined as follows: In the case of using only one surface of the schaukasten as in an exposure device of conventional copying machines, it is considered to remove non-uniform intensity of light on the required surface by forming the reflection member to have an elliptic or parabolic cross section. In a device for observing an image forming film with the unaided eye, such as the schaukasten, however, unevenness in the distribution of luminous flux in the direction of observation as well as on the diffusive transparent plate plays an important role. Accordingly, in a device having incorporated therein a dot-like or linear source of light, for removing unevenness in the distribution of luminous flux in the direction of observation, it is preferred to increase the distance between the light source and the plane of observation and to diffuse light in the space; but this does not permit reduction of the thickness of the schaukasten. In view of the above, in the thin schaukasten in which the distance between the fluorescent lamp and the plane of diffusion of light, it is necessary to eliminate the space for diffusion for removing non-uniformity in the intensity of light or to diffuse light in a small space. In the present invention, non-uniformity in the intensity of light is removed at a position as close to the fluorescent lamp as possible, which has not been proposed in the part, and only by adoption of such tactics, it is possible to determine the constructions, configurations and sizes of the diffusive transparent plate, the light homogenizing member, the fluorescent lamps and the reflection member and their relative arrangement, as shown in the present embodiment.

When use was made of a light homogenizing member having formed thereon a black-colored absorption pattern, in place of the reflection pattern, to provide a proper distribution of transmission with respect to the aforesaid distribution of luminous flux, substantially no unevenness was visible in the intensity of light on the diffusive transparent plate in any directions, but the mean illuminance on the diffusive transparent plate dropped about 30%. When the reflection pattern was formed on the inside of the diffusive transparent plate to provide thereon a proper distribution of transmission with respect to the distribution of luminous flux, unevenness in the intensity of light was almost removed, and non-uniformity in the intensity of light was hardly observed in a direction perpendicular to the diffusive transparent plate, but such non-uniformity in the intensity of light was found in a direction oblique to the diffusive transparent light. These phenomena were also observed in the cases where the abovesaid reflection member was formed in the shape of a box and where the reflection member was formed elliptic and parabolic in its cross section in a direction perpendicular to the axis of the fluorescent tube.

As described above, the schaukasten of this embodiment is simple-structured, and by providing the diffusive transparent plate, the light homogenizing member having formed thereon the reflection pattern, the fluorescent lamps and the reflection plate in this order at the aforementioned positions, non-uniformity in the intensity of light is prevented and light loss is reduced. The number of fluorescent lamps used is small, the parts are simple in shape and the lighting circuit can be used in common, so that the manufacturing cost and power consumption of the schaukasten can be reduced. Further, since the lighting circuit is used in common to the fluorescent lamps, no dispersion is introduced in the lighting frequency to ensure stabilized operation, and since the fluorescent lamps are lit at a high frequency, they can be prevented from flickering and optimum brightness can be obtained; therefore, the operator's eyestrain can be avoided. Moreover, since the lighting circuit is used in common and since the number of fluorescent lamps used is small, the schaukasten can be made light-weight.

In the present embodiment, the casing 1 may be formed of iron, plastic or like material and is not limited in construction and in configuration, so long as it is constructed to be capable of supporting the diffusive transparent plate 2, the light homogenizing member 3, the fluorescent lamps 4 and 4' and the reflection member 5 and to be able to be hung on a wall or set on a desk. The diffusive transparent plate is not subject to any limitations in its thickness, diffusion coefficient and surface roughness and can be formed by a frosted glass plate, opalescent vinyl chloride plate or the like, so long as it permits diffuse transmission of light.

The acrylic plate forming the light homogenizing member 3 need not always be completely transparent but may also be opalescent to permit diffuse transmission of light, and this member may be made of glass or styrene resin, so long as it permits the passage therethrough of light; furthermore, the member 3 may be a vinyl chloride, polyester or like film. The reflection pattern 9 on the light homogenizing member 3 is not limited specifically to the white ink but may also be formed by pasting a metal of direct reflection or coating a metal powder. The ink for the reflection consists principally of a metal oxide such as titanium oxide, magnesium oxide or zinc oxide, or their compound or mixture.

The reflection member 5 need not always be an aluminum plate having a mirror surface, but the mirror surface may also be obtained by plating or evaporation on a metal or plastic substrate or by pasting to such a substrate a film having vapor deposited thereon a metal. Further, the reflection member 5 may be formed by bending a plate or by means of vacuum forming or extrusion molding, and no particular limitations are imposed on the thickness and the material of the reflection member 5, so long as it can be formed in the aforesaid shape to have at least one mirror surface.

The lighting frequency of the lighting device 6 is not limited specifically to 20 KHz but must be a frequency which does not cause flickering of the fluorescent lamps. No particular limitations are imposed on the lighting voltage and its waveform.

The lighting circuit is not limited specifically to the circuit arrangements shown in FIGS. 5, 6 and 7 but is required only to have a frequency which does not cause flickering of the fluorescent lamps. The number of the fluorescent lamps need not always be two but may also be three or more, in which case they can be lit by the circuit shown in FIG. 8. The fluorescent lamps may be daylight, warm white or high color redition. Further, the flat schaukasten of this invention does not place any restrictions on the length and diameter of the fluorescent lamps used.

Figure 9A:
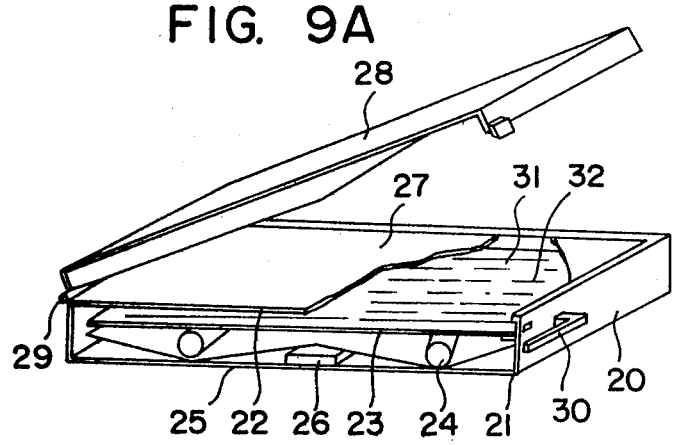
FIG. 9A illustrates another embodiment of the thin schaukasten of this invention.

Turning now to FIG. 9A, another embodiment of this invention will be described. Reference numeral 20 indicates generally a flat schaukasten which comprises a casing 21, a diffusive transparent plate 22, a light homogenizing member 23, a fluorescent lamp 24, a reflection member 25 and a lighting device 26 and which is adapted to instal an X-ray film. For protecting a light diffusing surface 27 of the diffusive transparent plate 22, a lid 28 is pivotally mounted by a hinge 29, on the casing 21 at one end thereof. Reference numeral 30 designates a handle mounted on the outside of the casing 21.

The diffusive transparent plate 22 is a 1.5 mm thick opalescent vinyl chloride plate. The light homogenizing member 23 is a 0.1 mm thick transparent polyester film 31 on which an aluminum-evaporated reflection pattern 32 is formed in stripes. The width of each stripe of the reflection pattern 32 is selected so that the luminous flux on the light diffusing surface 27 is distributed thereon uniformly; and the widths of the stripes are distributed in such a manner as to bear a substantially opposite relationship to the liminous flux directed to the transparent polyester film 31.

The reflection pattern 32 can be formed by the following method. At first, the luminous flux on the light homogenizing member 23 irradiated by light from the fluorescent lamp is detected by a photo sensor disposed on the same plane as the light homogenizing member 23. Then, a signal from the photo sensor is applied to a nonlinear circuit wherein it is substantially reciprocated, and by an optical system composed of a strobo, a shutter and lens scanning the signal in synchronism with the position of the photo sensor on the light homogenizing member 23, a shutter and lens, square dots having an area ratio are printed in the form of stripes on a silver salt film, and then the stripes are printed on a photosensitive aluminum-evaporated film (Kimoto & Co., Ltd., K.D.P. film) using the silver salt film and developed. The aluminum-evaporated reflection pattern thus obtained is used as the reflection pattern.

The fluorescent lamp 24 is a commercially available 32 W circular daylight fluorescent lamp and is disposed substantially concentrically with the diffusive transparent plate 22.

Figure 9B:
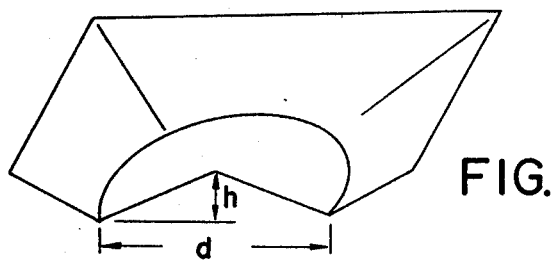
FIG. 9B is a sectional view of one part of the schaukasten shown in FIG. 9A.

The reflection member 25 is made by vacuum forming of ABS resin, and the surface on the side of the fluorescent lamp 24 is plated to form a mirror surface. The reflection member 25 has such a configuration as shown in FIG. 9B which has a cone on the inside of a truncated cone. In FIG. 9B the height h of the cone is 22 mm and the diameter d of the bottom of the reflection member 25 is 273 mm.

Figure 10:
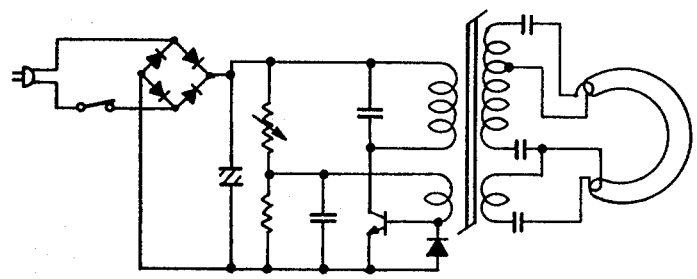
FIG. 10 is a circuit diagram of a lighting circuit for use in the embodiment of FIG. 9A.

In FIG. 9A, the distance between the bottom panel of the casing 20 and the light diffusing surface 27 is 65 mm; the distance between the diffusive transparent plate 22 and the light homogenizing member 23 is 25 mm; and the shortest distances between the outer wall of the fluorescent lamp 24 and the light homogenizing member 23 and between the outer wall of the fluorescent lamp 24 and the reflection member 25 are respectively 2 mm. The fluorescent lamp 24 and the reflection member 25 are disposed substantially concentrically. The fluorescent lamp 24 is lit by the lighting device 26 at a frequency of 25 KHz. FIG. 10 shows a circuit diagram of the lighting device 26. In FIG. 10, the transistor is 2SC 1106 (Nippon Electric Co., Ltd.) and the core is EJ 30 H5A (TDK Electronics Co., Ltd.).

When the diffusive transparent plate 27, with the fluorescent lamp 24 lit, was observed with the unaided eye, substantially no unevenness was found in the intensity of light on the plate 27, and flicker due to the lighting frequency was not perceived.

As described above, the flat type schaukasten of this embodiment employs a single fluorescent lamp and hence can easily be reduced in size, weight and cost and consumes less power. Further, since no flicker is perceivable, the schaukasten of this embodiment does not impose any unnecessary strain on the operator.

In the schaukasten of this embodiment, the film may be fixed in any desired manner and the parts may also be mounted by any desired means. Also, it is possible to attack accessories and to provide a member for fixing the schaukasten. Further, the casing may be made of any desired material and in any desired shape, and no limitations are imposed on the kind, number and size of each electrical part constituting the lighting device, so long as it is capable of lighting the fluorescent lamp at a frequency that does not cause any perceivable flicker.

It is difficult to precisely define the aforementioned "substantially opposite relationship" between the distribution of luminous flux and the distribution of transmission on the light homogenizing member, since the luminous flux at the position of the light homogenizing member varies in dependence on whether the reflection pattern is formed or not. However, if a value which is corrected by increasing or decreasing it in the case of the reflection pattern being provided is considered, the abovesaid relationship can be approached to an ideal "opposite relationship". Accordingly, the word "substantially" means to include correction based on the presence of the reflection pattern and the reflection surface in addition to tolerance of non-uniformity in the luminous intensity. In the present invention, successive approximation of the "substantially opposite relationship" becomes an ideal one.

In the present invention, the diffusive transparent plate may be formed of plastic or glass, or by a combination of white sponge and transparent plastic, so long as it permits uniform diffuse transmission of light, and this plate may be of a flat, curved or like configuration. The reflection pattern may also be of a square, circular or any other shapes. The light homogenizing member is described to have formed thereon the reflection pattern, but it is also possible to form on the light homogenizing member a light transmission pattern by forming a reflection layer on the entire area or one part of one surface of a transparent support media and then selectively etching away the reflection layer. The transparent support media may be made of glass, plastic, organic matters or a combination of them, so long as it permit the formation of the reflection pattern, and this support media may be of a curved, flat or like configuration. Further, this support media may be formed of cloth, sponge or like elastic material.

The fluorescent lamp may be straight, circular, U-shaped or L-shaped and is not subject to any restrictions in its diameter and color of light. The reflection member is also not limited specifically to that used in the first foregoing embodiment so long as it has such a configuration that it is substantially parallel with the axis of the fluorescent tube and that a and b are respectively larger than a' and b' in the normal path from the outer wall of the fluorescent tube, as shown in FIG. 4. The reflection member may be formed of metal or plastic.

As has been described in the foregoing, the flat type schaukasten of this invention comprises the diffusive transparent plate, the light homogenizing member, the fluorescent lamp or lamps and the reflection member, and the lighting frequency for the fluorescent lamp is selected to be one that does not cause visually perceivable flicker. Hence, the present invention has the following advantages:

(1) The thickness of the schaukasten can be reduced and a light diffusing surface of uniform brightness can be obtained.

(2) Since the luminous flux from a commercially available fluorescent lamp can be effectively utilized, so that the schaukasten can be reduced in cost and in power consumption.

(3) Since the number of fluorescent lamps used is small and the lighting circuit is used in common to them, the schaukasten can be made lightweight and small and hence is easy to carry.

(4) Since the light diffusing surface can be held at proper brightness, an unnecessary strain is not imposed on the operator's eyes.

(5) Since flicker can be avoided, no unnecessary strain is imposed on the operator's eyes even when the schaukasten is used for many hours.

Further, the following advantage is also obtained by selecting the distance between the diffusive transparent plate and the light homogenizing member to be larger than the distance between the light ohmogenizing member and the fluorescent lamp and by selecting the transmission of the light homogenizing member to be above 40%.

(6) Unevenness in the luminous intensity on the light diffusing surface can be removed in all directions.

It will be apparent that many modifications and variations may be effected without departing from the scope of the novel concepts of this invention.

What is claimed is:

1. A thin schaukasten for observing an image forming film through utilization of rays of light passing through a light diffusing plane, comprising at least a diffusive transparent plate, a light homogenizing member, a fluorescent lamp, and a reflection member, the light homogenizing member being a transparent support media having formed thereon a reflection pattern, wherein the distribution of transmission bearing substantially opposite in its relationship to the distribution of luminous flux applied to the transparent support media is provided by the reflection pattern.

2. A thin schaukasten according to claim 1, wherein the distance between the diffusive transparent plate and the light homogenizing member is larger than the shortest distance between the light homogenizing member and the outer wall of the fluorescent lamp, wherein the reflection member is disposed in parallel with the axis of the fluorescent lamp, and wherein the reflection member has such a configuration such that at least in the normal path from the outer wall of the fluorescent lamp, the distance between the reflection member and the diffusive transparent plate is larger than the distance between the outer wall of the fluorescent lamp and reflection member.

3. A thin schaukasten according to claim 1, wherein the transmission of the light homogenizing member is above 40%.

4. A thin schaukasten according to claim 3, wherein the reflection pattern formed on the light homogenizing member is an assembly of dot-like reflection surfaces of different sizes.

5. A thin schaukasten according to claim 3, wherein the reflection pattern formed on the light homogenizing member is an assembly of stripe-like reflection surfaces of different widths.

6. A thin schaukasten according to claim 1, wherein there is provided a frequency converter in a lighting circuit for the fluorescent lamp.

7. A thin schaukasten according to claim 6, wherein the fluorescent lamps are lit at a frequency above 16 KHz.

8. A thin schaukasten according to claim 6, wherein a plurality of fluorescent lamps are provided and use the lighting circuit in common to them.

* * * * *